3,352,734
PROCESS FOR THE PRODUCTION OF
NON-WOVEN FABRICS
James Eric McIntyre, Ralph John Basil Marsden, and Hendry Wilson Dempster, Harrogate, England, assignors to Imperial Chemical Industries Limited, London, England, a corporation of Great Britain
No Drawing. Filed Aug. 19, 1963, Ser. No. 303,183
Claims priority, application Great Britain, Aug. 30, 1962, 33,383/62
6 Claims. (Cl. 156—180)

This invention relates to a treatment of non-crystalline undrawn synthetic filaments, more particularly it relates to non-woven fabrics obtained by such a treatment.

We have made the observation that undrawn polyester fibres or filaments can be made into strong non-woven fabrics when the undrawn filaments in their substantially non-crystalline condition are treated with certain liquid solvents and laid down in a suitable pattern. Unexpectedly strong bonds at the contact points are obtained after evaporation of the solvent.

Many solvents for crystalline polyesters are known, some of which are solvents only at elevated temperatures, some of which are solvents at ordinary temperatures. The use of such solvents for binding the fibres together has been previously suggested (for example in British patent specns. 799,046; 906,889; and 911,282). Such solvents, although suitable for bonding drawn and crystalline fibres, are unsuitable for use with undrawn fibres, which are too readily dissolved or otherwise destroyed during the bonding process.

It is also known to make complete solutions of polyesters in certain halogenated hydrocarbons, provided that temperatures below 0° C. are used. These solutions are said to be suitable for making a powdered polyester or for dry spinning; (as disclosed in British patent specification 839,791.)

The solutions, although stable at the temperatures below 0° C., are however metastable at more elevated temperatures such as normal room temperatures and deposit crystalline polyester. There is no suggestion of making use of this property for bonding polyester shaped structures to each other.

We find that when an amorphous shaped polyester structure is brought into contact with a solvent at a temperature at which only metastable solutions can be obtained, the surface of the polyester is first softened and then crystallised, and this phenomenon provides an excellent and self-limiting method of bonding surfaces of shaped amorphous polyester filaments, fibres, or films to each other, at temperatures above 0° C.

According to our invention therefore, we provide a process for the production of non-woven fabrics comprising the steps of treating non-crystalline undrawn polyester filaments with a liquid which is a solvent for the amorphous polyester but which does not dissolve the crystalline polyester when placed in contact with it at the temperature of application, bringing the filaments into contact with each other at a temperature above 0° C. while the surface is wet or swollen by the solvent, and evaporating the solvent to leave a bond between the filaments, said bond consisting of crystalline or partly crystalline polyester derived from the polyester filaments.

By non-crystalline undrawn polyester filaments we mean one or more filaments, or fibres when the context so allows, whose X-ray diffraction spectrum shows only diffuse scattering without the presence of discrete X-ray diffraction spots or circles, although the diffuse halo may vary in intensity at different angles from the equator to the meridian of the photograph when taken on a flat plate X-ray camera. A proportion of other filaments or fibres may also be placed in contact with the defined undrawn filaments.

Liquids or solvents which are suitable for use in our invention cause a strong bond between two pieces of the amorphous polymer when surfaces wetted by the liquid are brought into contact and the liquid is allowed to evaporate but do not dissolve the crystalline polymer when placed in contact with it at the same temperature.

In the case of non-crystalline undrawn filaments melt spun from polyethylene terephthalate these should preferably have a birefringence of not more than $50 \times 10^{-3}$.

It should be appreciated that the filaments having the specified birefringence should be non-crystalline.

Solvents particularly suitable for use in the process of this invention include methylene chloride, chloroform, ethylene dichloride, 1,2-dichloroethylene, sym-tetrachloroethane, sym-tetrabromoethane, bromoform, and chloroacetonitrile.

Other solvents which are sufficiently good solvents for amorphous aromatic polyesters to provide a bond include dioxan and dimethyl formamide, but these are less technically and commercially attractive. Certain other solvents provide a bond, but do not readily crystallise the fibre; these include m-cresol, certain aromatic amines such as aniline, m-toluidine, or 2-chloro-4-methyl aniline, concentrated nitric acid, and other known solvents for crystalline polyesters such as o-chlorophenol, dichloroacetic acid, and concentrated sulphuric acid. These solvents are less desirable since their solvent effect is difficult to control and they tend, if allowed to remain in contact with the fabric, to produce broken threads; if applied in a concentrated form they may also cause breakage of the thread line before a fabric has been formed. Even if they are applied when diluted with a non-solvent or with a solvent which promotes crystallisation, they must be removed from the fabric once a bond has been obtained.

It is a feature of those solvents which crystallise the amorphous polymer that lowering the temperature of the polymer/solvent system substantially reduces the rate of crystallisation, whereas elevating the temperature increases the rate of crystallisation. Although this feature may be used to modify the cohesive action of the solvents, it is usually convenient to operate the process at or near to room temperature. It should be noted that the majority of solvents which are not suitable for bond formation leave the amorphous polymer unaffected or slightly crystalline on the surface and produce no bond when the wetted surfaces of the polymer are brought into contact and after evaporation of the solvents. In this connection not all chlorinated aliphatic solvents are suitable for bond formation; thus carbon tetrachloride, trichloroethylene, and tetrachloroethylene are unsuitable, being poor solvents for amorphous aromatic polyesters.

Mixtures of solvents for undrawn polyester with non-solvents may be used, particularly if the solvent is present in greater proportion or if the non-solvent is more volatile than the solvent. Mixtures of solvents for undrawn polyester with solvents for drawn polyester may also be used, but high concentrations of solvents for drawn polyester should be avoided since they may cause breakage of the thread line or of threads in the fabric. The solvent for undrawn polyester may, if desired, be applied in the form of an emulsion in water.

The solvents can conveniently be applied by coating the filaments by placing them for a very short time in contact with a rotating wheel which passes through a bath of the solvent and carries a film of solvent round on its surface. Other methods include passing the filaments for a short time through a bath of solvent, or spraying or dripping solvent onto the thread line, or contacting the filaments with a wick dipping into the solvent.

The filaments can conveniently be laid down to form a fabric such e.g. as a net by winding them up or laying them on a shaped surface, such as a bobbin or a large cylinder, or a belt, using a suitable traverse motion. The angle between the fibres can be varied by varying the rate of traverse, and a desirable method of working is to provide a traverse moving at a linear speed similar to the linear surface speed of the bobbin; in this case the angle between the filaments is approximately a right angle. By varying the rate of traverse many different angles of lay down may be obtained on the same surface, and this can cause an increase in strength of the resulting fabric in some directions.

Other known methods of laying down may be used. Thus for example the traverse motion may be provided by one or more reciprocating or rotatable guides which lay down the filaments e.g. in a trochoidal manner or in a related figure formed by causing the traverse device to rotate in an ellipse. Yet another method comprises laying down the undrawn filaments cross-wise onto a warp of similar undrawn fibres which may be moving or stationary.

Provided the surface on which the filaments are laid down and the source of the filaments are moved relative to each other in a suitable way, it is immaterial whether one or the other or both are moved. For example, the filaments may be provided by a spinneret or series of spinnerets, having a multiplicity of holes arranged e.g. in a straight line or another suitable pattern, moving relative to the surface on which the fibres are laid down, without the intervention of a traverse device. Alternatively a spinneret bearing a bank of holes at right angles to the general direction of motion of the surface may be used, and the surface may be moved with a jigging action in a direction other than the general direction of motion such that a point on the surface describes, for example, a sinusoidal, cycloidal or trochoidal path.

The filaments may be treated after extrusion from the spinneret, the solvent coating taking the place of or accompanying spin finish application, or the undrawn fibres may be wound without treatment on a bobbin in the normal way, then unwound when required and coated with solvent before being laid down to form a fabric.

The fabrics produced by this process can be drawn by known processes such as hot stentering in order to increase the tenacity of individual fibres.

The following examples illustrate but do not limit our invention.

Example 1

Polyethylene terephthalate was spun from a single hole spinneret, passed tangentially in contact with a rotating glass wheel which bore a thin film of liquid, then through a traverse device and on to a rotating bobbin. The thin film of liquid on the wheel was maintained by immersing the lowest segment of the wheel in a bath of the liquid, and rotating the wheel at a rate great enough to prevent complete evaporation of the film lifted out of the bath during the course of a revolution. The filament of polyethylene terephthalate, during its period of contact with the wheel, picked up a thin film of liquid. Various bobbin surface speeds from 400 to 3000 feet per minute were used, and the traverse rate was also varied from bobbin to bobbin, and occasionally during the course of winding up onto a single bobbin, so that filaments were laid down at various angles to one another. When suitable liquids were used as films on the rotating wheel, the filaments stuck together where they crossed on the bobbin, and once the liquid had evaporated off or been washed off by a non-solvent for amorphous polyester the filaments laid down on the bobbin could be slid or cut off and obtained in the form of a strong, tenaciously bound non-woven fabric. Liquids which gave non-woven fabrics in this way were: chloroform; 1,1,2,2-tetrachloroethane; methylene chloride, 1,2-dichloroethylene, ethylene dichloride.

Example 2

A copolymer of polyethylene terephthalate and polyethylene sebacate, containing the two components in a molar ratio of 80:20, was spun as in Example 1 at a temperature of 244° C., and passed tangentially in contact with a glass wheel, through a traverse device, and onto a rotating bobbin. The glass wheel dipped into a bath containing a mixture of chloroform and a 5% solution of spin finish, coming into contact with both layers, and carried a thin film round on its surface. The filaments so treated stuck to each other on the bobbin to provide a non-woven fabric which could be slid or cut off the bobbin. This fabric was strong and resistant to tearing. The dimensional stability was improved by heat setting it at constant length at 120° C.; the fabric could also be drawn by subjecting it to tension at a temperaure of 120° C.

What we claim is:

1. A process for the production of non-woven fabrics comprising the steps of treating amorphous undrawn polyester filaments of meltspun polyethylene terephthalate with a birefringence up to $50 \times 10^{-3}$ with a liquid which is a solvent for the amorphous polyester but which does not dissolve crystalline polyester when placed in contact with it at the temperature of application said solvent being selected from the group consisting of methylene chloride, chloroform, ethylene dichloride, 1,2-dichloroethylene, sym-tetrachloroethane, sym-tetrabromoethane, bromoform and chloroacetonitrile, bringing the filaments into contact with each other at a temperature from 0° C. to ambient temperature while the solvent is present on the surface thereof, and evaporating the solvent to leave a bond between the filaments, said bond consisting of at least partially crystalline polyester derived from the polyester filaments.

2. A process according to claim 1 in which the solvent for the undrawn polyester is applied in the form of an emulsion in water.

3. A process according to claim 1 in which the solvent is applied by passing the filaments through a bath of solvent.

4. A process according to claim 1 wherein the solvent is applied by spraying the solvent onto the filaments.

5. The process according to claim 1 wherein the solvent is applied by dripping the solvent on the threadline of the filaments.

6. The process according to claim 1 wherein the solvent is applied by contacting the filaments with a wick dipping into the solvent.

References Cited

UNITED STATES PATENTS

| | | | |
|---|---|---|---|
| 2,497,376 | 2/1950 | Swallow et al. | 260—33.8 |
| 2,820,735 | 1/1958 | Amborski | 161—231 X |
| 2,849,359 | 8/1958 | Smith | 161 |
| 2,988,469 | 6/1961 | Watson | 161—150 X |
| 3,010,858 | 11/1961 | Sexsmith | 161—150 |
| 3,014,011 | 12/1961 | Zoetbrood | 260—33.8 |
| 3,014,830 | 12/1961 | Stallard et al. | 260—33.8 |
| 3,180,775 | 4/1965 | Sexsmith | 161—157 |
| 3,236,587 | 2/1966 | Genereux | 156—305 |

FOREIGN PATENTS 574,562  4/1959  Canada.

MORRIS SUSSMAN, *Primary Examiner.*